US010373145B2

(12) United States Patent
Hu et al.

(10) Patent No.: US 10,373,145 B2
(45) Date of Patent: Aug. 6, 2019

(54) REAL-TIME DATA STORAGE AND ANALYTICS SYSTEM

(71) Applicant: MASTERCARD INTERNATIONAL INCORPORATED, Purchase, NY (US)

(72) Inventors: Po Hu, Norwalk, CT (US); Tong Zhang, Fort Lee, NJ (US); Ramamohan Sangasani, White Plains, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 788 days.

(21) Appl. No.: 14/829,400

(22) Filed: Aug. 18, 2015

(65) Prior Publication Data

US 2017/0053256 A1    Feb. 23, 2017

(51) Int. Cl.
*G06F 16/22* (2019.01)
*G06F 16/28* (2019.01)
*G06Q 20/20* (2012.01)

(52) U.S. Cl.
CPC ........... *G06Q 20/204* (2013.01); *G06F 16/22* (2019.01); *G06F 16/285* (2019.01); *G06Q 20/206* (2013.01)

(58) Field of Classification Search
CPC ................ G06Q 20/204; G06Q 20/206; G06F 17/30312; G06F 17/30598

USPC .......................................................... 705/17
See application file for complete search history.

(56) References Cited

U.S. PATENT DOCUMENTS

| 9,892,145 | B2* | 2/2018 | Bonner | ............ G06F 17/30339 |
| 2004/0102980 | A1* | 5/2004 | Reed | ...................... G06Q 30/02 |
| | | | | 705/1.1 |
| 2012/0072656 | A1* | 3/2012 | Archak | ............. G06F 17/30132 |
| | | | | 711/104 |

* cited by examiner

*Primary Examiner* — Florian M Zeender
*Assistant Examiner* — Joseph M Mutschler
(74) *Attorney, Agent, or Firm* — Sheppard Mullin Richter & Hampton LLP (57) ABSTRACT

Systems and methods are provided for storing, sorting, and analyzing account transactions in a payment network, and for real-time data analytics. One embodiment of a real-time data storage and analytics system includes a payment network that collects and processes account transactions. The system also includes a first data cluster that includes a first data structure. The first data structure stores a set of the account transactions. Additionally, the system includes a second data cluster that in turn includes a second data structure. The second data structure stores account transactions for new account and account transactions for which there is insufficient space in the first data structure. Moreover, the system includes an application engine that generates a score for an account based on transaction data associated with the account transactions for the account.

7 Claims, 7 Drawing Sheets

| First Address | Validation Code | No. Filled Transactions | No. Unfilled Transactions | ... | Filled and Empty Transaction List | |
|---|---|---|---|---|---|---|
| B1 | 1 | A | X | ... | Transaction_1 ... Transaction_A | Reserved_1 ... Reserved_X |
| B2 | 2 | B | Y | ... | Transaction_1 ... Transaction_B | Reserved_1 ... Reserved_Y |
| B3 | 3 | C | Z | ... | Transaction_1 ... Transaction_C | Reserved_1 ... Reserved_Z |

| Second Address | Validation Code | No. Filled Transactions | No. Unfilled Transactions | ... | Filled and Empty Transaction List | |
|---|---|---|---|---|---|---|
| D2 | 2 | D | T | ... | Transaction_1 ... Transaction_D | Reserved_1 ... Reserved_T |
| D4 | 4 | E | U | ... | Transaction_1 ... Transaction_E | Reserved_1 ... Reserved_U |

| Address | | First Data Structure | | Second Data Structure | | Account Attributes | |
|---|---|---|---|---|---|---|---|
| First Address | Second Address | No. Filled Transactions | No. Unfilled Transactions | No. Filled Transactions | No. Unfilled Transactions | Account ID | Other Account Level Fields |
| B1 | -- | A | X | -- | -- | A1 | ... |
| B2 | D2 | B | Y | D | T | A2 | ... |
| B3 | -- | C | Z | -- | -- | A3 | ... |
| -- | D4 | -- | -- | E | U | A4 | ... |

REAL-TIME DATA STORAGE AND ANALYTICS SYSTEM

TECHNICAL FIELD

The present disclosure relates generally to electronic transaction processing. More particularly, the present disclosure is directed to systems, methods, and devices for real-time storing, sorting, and analyzing of large data sets generated in connection with a payment network.

BACKGROUND

The use of payment cards for a broad spectrum of cashless transactions has become ubiquitous in the current economy, accounting for hundreds of billions of dollars in transactions per year. For example, MasterCard International Incorporated, one example of a payment card network operator, processes millions of transactions per hour across roughly 230 countries. Aspects involved with the use of payment cards typically include the authentication of the payor/consumer using the payment card, as well as the authorization of the transaction based upon the availability of monies in the payor's/consumer's bank account.

During this cashless transaction process, a large amount of transaction data is generated and collected, often rapidly. In a traditional relational database, such transaction data is typically stored in a normalized fashion, and may be retrieved using index keys for efficiency. More recent databases have started adapting from this traditional approach, for example, with the ability to store and execute on unstructured data and without the use of index keys. One example of such a system is a Hadoop® network. Hadoop networks are typically designed to provide parallel computing for "big data" in applications such as social media and the like, in which the data grows exponentially and tends to be difficult to timely (i.e., rapidly) collect in a structured manner.

While the parallel, speedy, and scalable nature of Hadoop networks can be useful for aggregating and organizing large data sets in real-time when structure is not critical, these types of networks often lack sufficient structure to be optimized for real-time and directed analytic applications. Therefore, once data is collected in Hadoop-type networks, real-time access and retrieval of the data can become difficult and awkward. In particular, existing Hadoop-like networks do not allow for efficient searching or parsing of collected data, and sequential searches and subsequent extracting or retrieval of data stored using these networks is often slow and is typically limited to smaller, less robust datasets.

SUMMARY

In view of the above shortcomings in conventional computing and database solutions, in analytic applications—and particularly in those implemented on large data sets and used in on-the fly actionable applications (e.g., big data)—there exists a need for providing some structure to the data storage, updating, and retrieval process used in a typical Hadoop environment or the like. In particular, there exists a need for a scalable, fast, and highly parallel payment network that, on the one hand, is capable of gathering significant amounts of data (e.g., generated in the transaction process) in an unstructured manner (where needed), and yet, on the other hand, is also sufficiently structured to enable real-time searching, updating, and extraction/retrieval of up-to-date, large data sets. In this connection, embodiments of the present disclosure include systems, methods, and devices capable of real-time storing, sorting, and analyzing of large data sets, such as those generated in connection with the operation of a payment network.

BRIEF DESCRIPTION OF THE DRAWINGS

Further aspects of the present disclosure will be more readily appreciated upon review of the detailed description of the various disclosed embodiments, described below, when taken in conjunction with the accompanying figures.

The figures are described in greater detail in the description and examples below, are provided for purposes of illustration only, and merely depict typical or example embodiments of the disclosure. The figures are not intended to be exhaustive or to limit the disclosure to the precise form disclosed. It should also be understood that the disclosure may be practiced with modification or alteration, and that the disclosure may be limited only by the claims and the equivalents thereof.

DETAILED DESCRIPTION

Embodiments of the present disclosure are directed to systems, methods, and devices for the real-time storing, sorting, and analyzing of data generated in connection with the operation of a payment network. The details of some example embodiments of the systems, methods, and devices of the present disclosure are set forth in the description below. Other features, objects, and advantages of the disclosure will be apparent to one of skill in the art upon examination of the present description, figures, examples, and claims. It is intended that all such additional systems, methods, features, and advantages be included within this description, be within the scope of the present disclosure, and be protected by one or more of the accompanying claims.

Figure 1:
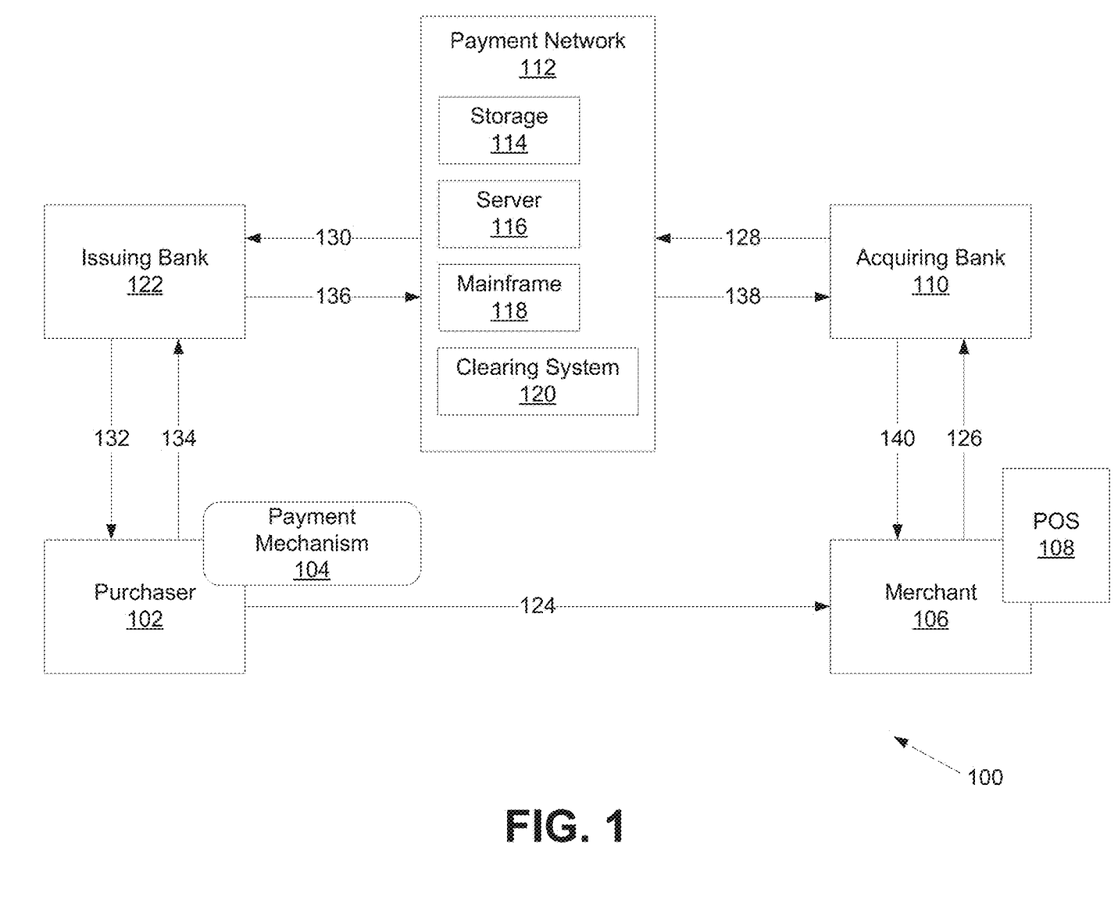
FIG. 1 illustrates an example payment card transaction processing system provided in connection with implementations of various embodiments of the disclosure.

As the present disclosure relates somewhat generally to electronic transaction processing and data generated and collected thereby, the following description provides relevant context for embodiments described herein. For example, FIG. 1 depicts example payment card transaction processing system 100, which may operate in connection with embodiments of the disclosed systems, methods, and devices. Transaction processing of card-based payments, including electronic payments, may include both an authorization side and a clearing side. System 100 depicts both the authorization side and the clearing side of card-based payment transactions.

The authorization side may involve the process of confirming that a cardholder (or purchaser) has a sufficient line of credit to cover a proposed payment for an item. The clearing side of the transaction may involve reconciliation between an issuing bank (of a payment card) 122 and an acquiring (or merchant) bank 110—e.g., determining the amount owed by issuing bank 122 to acquiring bank 110 or vice versa. Later on, funds may be exchanged between issuing bank 122 and acquiring/merchant bank 110, typically based on the clearing process.

In a typical card-based payment system transaction (or purchase transaction), purchaser 102 presents payment mechanism 104, which in various embodiments is a credit/debit/prepaid card, to merchant 106 for the purchase of an item. This purchase transaction is indicated by arrow 124. The item may be a good and/or a service. "Payment mechanism" 104 or "payment card," as used herein, may also refer to a conventional magnetic-stripe credit or debit card, or similar proximity payment device (utilized on its own or incorporated into another device such as a mobile telephone, personal digital assistant (PDA), etc.) having near field communications (NFC) capabilities, such as a radio frequency identification (RFID) chip implemented therein. "Payment mechanism" 104 or "payment card" may also further refer to virtual or limited-use account numbers and electronic wallets and the like, such as may be used in online transactions.

It will be understood by those of ordinary skill in the art that, prior to the occurrence of such a transaction, purchaser 102 was issued payment mechanism 104 by issuing bank 122. Each payment mechanism 104 is typically associated with an account of purchaser 102, whether purchaser 102 is an individual or some other entity. Likewise, each transaction entered into using payment mechanism 104 is associated with the account. In this regard, for each purchase transaction, payment network 112 processes account transactions by associating each transaction with the corresponding account, as is described in detail below. Periodically, as payment network 112 collects and processes account transactions, the information associated with these transactions is stored and sorted so that it may be subsequently analyzed, dispersed, and the like, as desired.

Moreover, it will be understood that merchant 106 has established a relationship with acquiring bank 110, thereby allowing merchant 106 to receive payment mechanism 104 (e.g., credit/debit cards) as payment for items. That is, merchant banks (e.g., 110) and issuing banks (e.g., 122) may participate in various payment networks, including, by way of example, payment network 112. One such payment network is operated by MasterCard International Incorporated, the assignee of the present disclosure.

Referring again to FIG. 1, as is known by those skilled in the art, after presentation of payment mechanism 104 to merchant 106 by purchaser 102, merchant 106 may send a request message (indicated by arrow 126), which in some embodiments may be all or part of an authorization request, to acquiring bank 110 via point-of sale (POS) terminal 108 located at or otherwise controlled by merchant 106. In turn, acquiring bank 110 communicates with payment network 112 (indicated by arrow 128), and payment network 112 communicates with issuing bank 122 (indicated by arrow 130) to determine whether purchaser 102 is authorized to make transaction 124. Issuing bank 122 either approves or declines the authorization request and thereafter transmits a response back to merchant 106 (indicated by arrows 136, 138, and 140). Merchant 106 may then either complete or cancel purchase transaction 124, based upon the response to the request message.

If purchase transaction 124 is approved, the transaction amount associated therewith will be sent from issuing bank 122 through payment network 112 to acquiring bank 110. The transaction amount, minus certain fees, will thereafter be deposited within a bank account belonging to merchant 106, in accordance with a process called settlement. Issuing bank 122 thereafter bills purchaser 102 (indicated by arrow 132) for all purchase transactions conducted over a given period of time by sending a statement to purchaser 102. Purchaser 102 responds by submission of payment(s) (as indicated by arrow 134) to issuing bank 122. This submission of payment(s) (as indicated by arrow 134) by purchaser 102 may be automated (e.g., in the case of debit transactions), may be initiated by purchaser 102 for the exact amount matching amounts of purchases during the statement period (e.g., charge cards or credit balances paid in full), and/or may be submitted (in part or in whole) over a period of time that thereby reflects the amount of the purchases, plus any financing charges agreed upon beforehand between purchaser 102 and issuing bank 122 (e.g., revolving credit balances).

Payment network 112 typically includes at least one of each of the following: storage 114, server 116, and mainframe 118. Mainframe 118 may include a processing device and may be configured to implement the authorization and clearing process, with such configuration and/or associated instructions being stored in storage 114 and through various network connections to respective counterpart computer systems at issuing bank 122 and acquiring bank 110. Storage 114 may include computer-readable-media storage technologies, such as a floppy drive, hard drive, tape drive, flash drive, optical drive, read-only memory (ROM), random access memory (RAM), and/or the like. Server 116 and storage 114 may be controlled by software/hardware and may store data and/or instructions to allow mainframe 118 to operate in accordance with aspects of the present disclosure. POS terminal 108 is in data communication, directly or indirectly, and at least from time to time, with, e.g., an acquirer host computer (not shown) that is part of payment network 112, and that is operated for or on behalf of acquiring bank 110, which handles payment card transactions for merchant 106. Server 116 may be operated by or on behalf of the payment network 112, and may provide central switching and message routing functions among the member financial institutions of payment network 112. Issuing bank 122 also may make use of an issuer host computer (not shown), and an access point (not shown), via which the issuer host computer exchanges data messages with server 116.

It should be noted that, in practice, payment card transaction processing system 100 may involve a number of cardholders/purchasers 102, POS terminals 108, merchants 106, acquirer host computers, issuer host computers, and access points, as well as a number of acquiring and issuing banks 110 and 122. In general, the acquirer host computer may receive authorization requests from POS terminals 108, forward the authorization requests through payment network 112, receive authorization responses, and relay the authorization responses back to POS terminal 108. Moreover, the issuer host computer may, in general, receive authorization requests from server 116 and transmit authorization responses back to server 116 based on the authorization requests.

Also included in a typical card-based payment system transaction are the clearing and settlement processes described above. Clearing (which may happen after transmission of the authorization response, if approved) may refer to a process by which issuing bank 122 exchanges transaction information with acquiring bank 110 (also referred to as merchant bank). Referring again to FIG. 1, acquiring bank 110 may transmit transaction information to payment network 112, which may include clearing system 120. Clearing system 120 may validate the transaction information and forward it to issuing bank 122, which prepares data to be included on a payment statement for purchaser 102. Clearing system 120 may then provide reconciliation data to both issuing bank 122 and acquiring bank 110.

Settlement may refer to a process by which issuing bank 122 exchanges the requisite funds with acquiring bank 110 to complete an approved transaction. In particular, acquiring bank 110 may send clearing data in a clearing message to payment network 112, whereupon payment network 112 calculates a net settlement position and sends advisement to acquiring bank 110 and issuing bank 122. Issuing bank 122 may remit payment to payment network 112, which then sends the payment to acquiring bank 110. Acquiring bank 110 then pays merchant 106 for the purchase made by purchaser 102, and issuing bank 122 bills purchaser 102.

Having provided this context for payment card transaction processing system 100, specific embodiments of the present disclosure will now be described. As will be understood by one of skill in the art, the above-described processing of transactions typically involves a significant amount of data being generated, stored, and transferred, particularly using payment network 112. In this regard, payment card transaction processing systems, such as system 100, typically utilize database capabilities within or in conjunction with payment network 112 to store, sort, and analyze transaction data associated with the transactions processed through system 100. As described above, these capabilities were traditionally based on relational databases, but have more recently started transitioning to Hadoop networks and the like.

Figure 2:
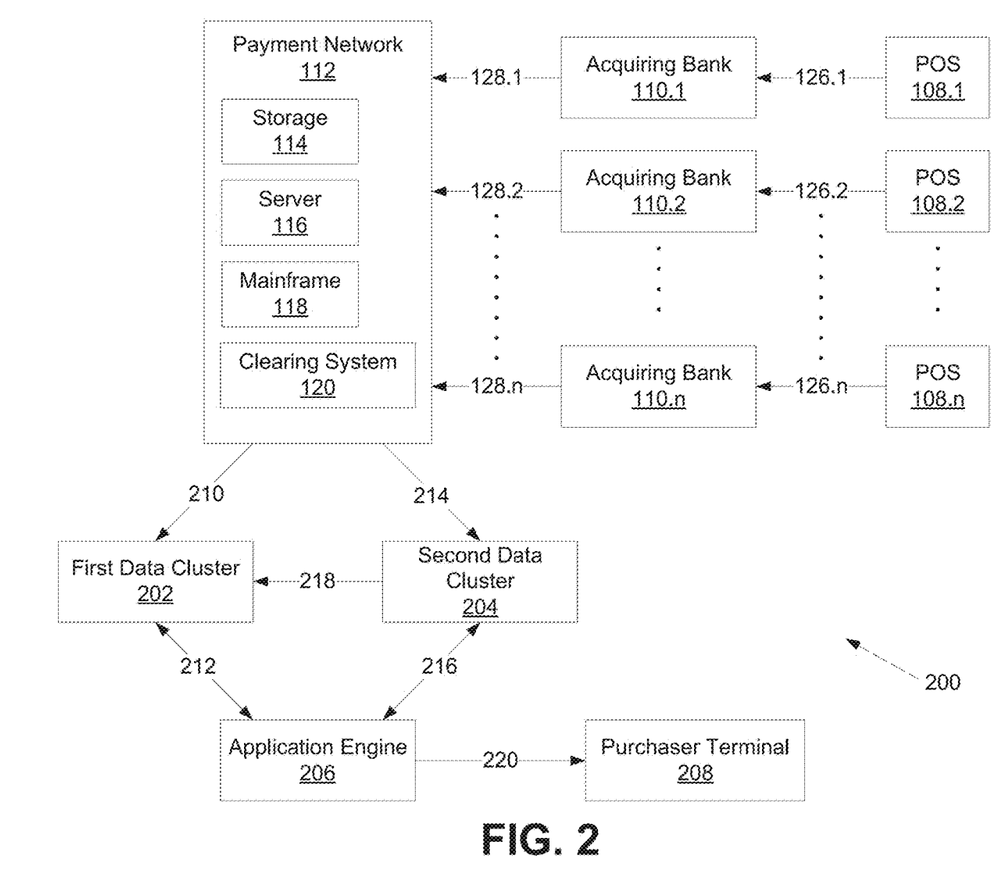
FIG. 2 illustrates an additional example real-time data storage and analytics system in which various embodiments of the disclosure may be implemented.

Turning now to FIG. 2, some embodiments of real-time data storage and analytics system 200 are depicted. As previously alluded to, the present disclosure relates to storing, sorting, and analyzing large data sets generated in connection with a payment network that processes transactions, for example, according to the above-described scenario. As further alluded to above, the present disclosure provides systems, methods, and devices for retrieving and evaluating information from large data sets such as those that may be generated from processing transactions. One such system is depicted in real-time data storage and analytics system 200. Moreover, aspects of system 200 may be used in conjunction with various methods disclosure herein, for example, for storing, sorting, and analyzing account transactions for a set of accounts in a payment network.

FIG. 2 illustrates example real-time data storage and analytics system 200. Where applicable, elements of system 200 may be considered to be the same or similar to like-numbered elements of FIG. 1, e.g., POS terminals 108.1-n, acquiring banks 110.1-n, and payment network 112 (and the example constituent elements thereof). Additional description may also be provided with respect to certain of these elements carried over from FIG. 1 as pertinent to the embodiments described with reference to FIG. 2. For example, as shown, system 200 includes a number of acquiring banks 110.1-n connected to payment network 112 with a number of connections 128.1-n, and a number of POS terminals 108.1-n connected to corresponding acquiring banks 110.1-n with a number of connections 126.1-n. Each POS terminal 108.1-n is used for purchase transactions, which are processed through acquiring banks 110.1-n and in turn may be tracked, stored, and processed by payment network 112.

As will be appreciated, in supporting a significant number of acquiring banks 110.1-n, POS terminals 108.1-n, payment mechanisms 104, and so on, a high volume of purchase transactions may be processed and accounted for by payment network 112. Furthermore, as described above and as will likewise be appreciated, each payment transaction processed by payment network 112 is associated with an account—i.e., the account of a purchaser 102 (or more generally, a "cardholder"). In this regard, the purchase transactions described above may be referred to herein as "account transactions," from the payment network perspective for the purposes of the present disclosure.

Thus, as generally set forth above, payment network 112 collects and processes account transactions. These account transactions, in various embodiments, originate with one or more of POS terminals 108.1-n. Given the large number of account transactions potentially stored, sorted, organized, and tracked by payment network 112, payment network 112 typically maintains a significant database of information related to the account transactions. For example, this database of information, which in whole or in part may be referred to herein as one or more data sets, may include such account-transaction-related information as the timing, purchase amount, frequency, general category, and location of purchases made, as well as information about items purchased. Typically, these data sets may be included in transactions files, wherein each transaction file is associated with an account of a purchaser 102. Thus, one of skill in the art will appreciate that a large collection of data sets, or various subsets thereof, may be analyzed to provide actionable input to purchasers. Such actionable input may include, for example, recommendations for future purchases, including items to be purchased, and may include available retailers in a purchaser's vicinity, ongoing or upcoming sales, and so on.

In order to process this information and to provide up-to-date recommendations to purchasers with a quick turn-around, as illustrated in FIG. 2, in addition to the above-described elements, real-time data storage and analytics system 200 further includes first data cluster 202, second data cluster 204, and application engine 206. First data cluster 202 includes a first data structure that stores a set of account transactions. Second data cluster 204 includes a second data structure that stores account transactions for new accounts and also stores account transactions for which there is insufficient space in the first data structure.

The account transactions stored by first and/or second data clusters 202 and/or 204 may be generated during the course of typical payment network purchase transaction processing and may be handled by payment network 112, as described above. As such, arrow 210 represents the transfer of account transactions and information associated therewith between payment network 112 and first data cluster 202, while arrow 214 represents the transfer of account transactions and information associated therewith between payment network 112 and second data cluster 204. Additionally, arrow 218 represents the transfer of account transactions and information associated therewith (e.g., in the form of transaction files stored in the second data structure) between second data cluster 204 and first data cluster 202. For example, arrow 218 may represent the merging of the second data structure in second data cluster 204 with the first data structure in first data cluster 202.

The operations associated with arrows 210, 214, and 218 will now be explained in further detail with regard to FIG. 2. Additional detail regarding these operations will also be expounded upon in connection with FIGS. 3A-C. In some example implementations of the disclosure, first data cluster 202 is used for bulk storage purposes. For example, first data cluster 202 may be used for principal data storage purposes for account transactions processed by payment network 112. Arrow 210 represents the scenario in which payment network 112 sends account transactions to first data cluster 202 for storage. Accordingly, as will be understood, first data cluster 202 may be very large in size, in some instances storing upward of 10+ trillion transactions. Given its size, first data cluster 202 is typically not designed to be rebuilt or reconstructed frequently—as reconstruction is time-consuming. Thus, first data cluster 202 may typically be reconstructed on a periodic basis—e.g., once per week. For example, payment network 112 may send a reconstruction command to first data cluster 202 to initiate reconstruction (also represented by arrow 210).

During reconstruction, first data cluster 202 is typically allocated sufficient space for storing account transactions processed by payment network 112 (this may be referred to as updating first data cluster 202) prior to the next reconstruction. In some instances, however, the volume of account transactions fluctuates for certain accounts. In such instances, certain transaction files within first data cluster 202 may effectively run out of storage space for account transactions. In order to avoid a time-consuming reconstruction, in this situation, overflow account transactions may be stored in second data cluster 204. Arrow 214 represents one scenario in which account transactions processed by payment network 112 are sent to second data cluster 204 for storage. In addition, account transactions for new accounts may also be stored in second data cluster 204, in order to avoid reconstructing first data cluster 202 to include a new transaction file for the new account. Arrow 214 may represent this scenario as well. Second data cluster 204 may be relatively small in size compared to first data cluster 202, typically by design, so that second data cluster 204 may be reconstructed, searched, and updated relatively quickly. Moreover, its relatively smaller size likewise allows for second data cluster 204 to be merged into first data cluster 202 more quickly (this merging is represented by arrow 218).

Referring again to FIG. 2, application engine 206 may be used to analyze the transaction information (or data) stored in first and second data clusters 202 and 204 in order to provide actionable input to purchasers. As such, arrows 212 and 216 represent the transfer of information between first data cluster 202 and second data cluster 204 on the one hand, and application engine 206 on the other hand. In various embodiments, system 200 further includes purchaser terminal 208, and application engine 206 provides actionable input to purchasers 102 using purchaser terminal 208. This is represented by arrow 220. Each of these elements of real-time data storage and analytics system 200 and their interaction with other elements of system 200 will be described in further detail below with reference to FIGS. 2 and 3A-C.

Figure 3A:
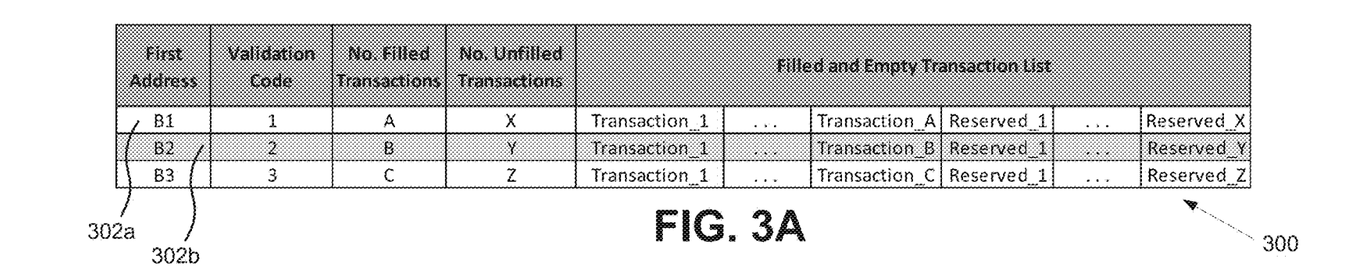
FIG. 3A illustrates an example data structure in connection with various embodiments of the disclosure.

FIG. 3A illustrates one example implementation of first data structure 300 included in first data cluster 202, as described above. As shown, first data structure 300 may be represented in tabular form. It should be noted, however, that first data structure 300 may be represented in other forms, as will be appreciated by one of skill in the art. In this example, first data structure 300 generally includes several fields, represented graphically in the columns of the top row of first data structure 300. As shown, in the illustrated embodiment, first data structure 300 includes the following example fields: first address, validation code, number of filled transactions, number of unfilled transactions, and filled and empty transaction list. In addition, first data structure 300 includes a number of transaction files 302a, 302b, etc. (e.g., represented by the second through fourth rows of first data structure 300 and also generally referred to using numerical indicator 302). Though only three transaction files 302 are shown, it will be appreciated that any number of transaction files 302 may be included in first data structure 300. Each transaction file 302 is associated with an account (e.g., of a purchaser who has been issued a payment card) and typically stores a number of account transactions associated with or entered into using that account.

As shown, each transaction file 302 includes the above-described fields contained in first data structure 300. By way of example, each transaction file 302 may include a unique address corresponding to a specific location in memory and contained in the first address field. The first address field thus identifies the location in memory at which the remainder of the information pertaining to transaction file 302 is stored. As mentioned above, first data structure 300 also includes a validation code field. The validation code of each transaction file 302 is typically specific to the account associated therewith, and may be used in various contexts to confirm or validate that information or transaction data is associated with one particular account, as opposed to any other account being processed by payment network 112.

As further illustrated in FIG. 3A, first data structure 300 in this example implementation includes fields for numbers of filled and unfilled transactions. Filled transactions represent the number of account transactions stored in transaction file 302 since the last time first data structure 300 in first data cluster 202 was reconstructed. As described above, when payment network 112 periodically reconstructs first data structure 300, first data structure 300 is allocated a number of reserved spaces for each existing transaction file 302 currently being maintained in accordance with the operation of payment network 112. It should also be noted that the allocated number of reserved spaces may vary among transaction files 302, as will be explained herein. Referring again to FIG. 3A, by way of example, transaction file 302a contains A completed or filled transactions and has space for X unfilled transactions remaining (i.e., A, X, and indeed B, C, Y, and Z represent number values in FIG. 3A).

The number of filled (A) versus unfilled (X) transactions is likewise represented in the filled and empty transaction list field—which, as shown in FIG. 3A, lists filled transactions 1 through A, as well as reserved (unfilled) spaces 1 through X. Thus, in this example, X represents the total number of unfilled transactions that may be stored in first data cluster 202 for transaction file 302a, and A+X represents the total number of transactions that may be stored in first data cluster 202 for transaction file 302a until first data structure 300 is reconstructed. Upon reconstruction of first data structure 300, each transaction file 302 may be allocated an additional number of reserved spaces that may be subsequently filled as account transactions are processed in connection with the account associated with transaction file 302.

The same principles described above with respect to transaction file 302a apply generally to all transactions files 302 in first data structure 300. Nevertheless, as shown in the illustrated embodiment, the various transaction files 302a, b, etc. have been allocated different numbers of reserved spaces, and have filled different numbers of transactions and thus have different numbers of reserved or unfilled spaces. Specifically, in this example, transaction file 302b has been allocated B+Y total spaces, and has filled B transactions, and hence has Y remaining unfilled spaces. Likewise, the transaction file 302 located at first address B3 (not numbered) has been allocated C+Z transaction spaces, and has filled C transactions, and hence has Z remaining unfilled transactions.

Figure 3B:
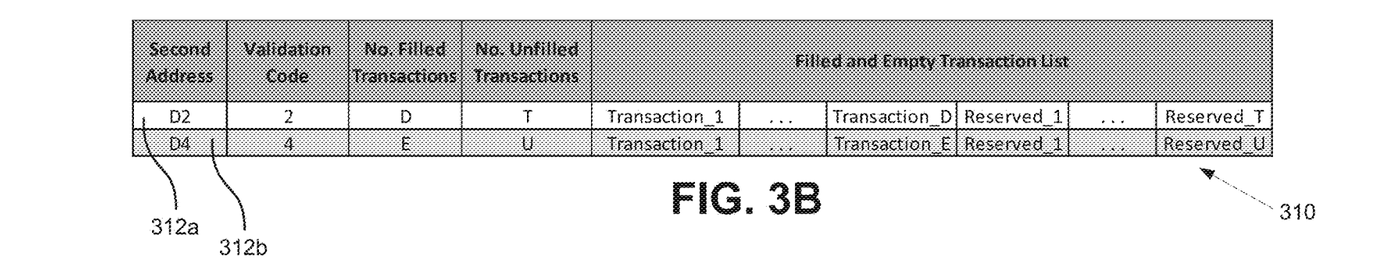
FIG. 3B illustrates another example data structure in connection with various embodiments of the disclosure.

As mentioned above with reference to FIG. 2, real-time data storage and analytics system 200 further includes second data cluster 204. Second data cluster 204 includes second data structure 310. FIG. 3B illustrates one example implementation of second data structure 310 included in second data cluster 204. As shown, second data structure 310 may be represented in tabular form but may be represented in other forms as well, as will be appreciated by one of skill in the art. In this example, second data structure 310 generally includes several fields, represented graphically in the columns of the top row of second data structure 310.

As shown, in the illustrated embodiment, second data structure 310 includes the following example fields: second address, validation code, number of filled transactions, number of unfilled transactions, and filled and empty transaction list. In addition, second data structure 310 includes a number of transaction files 312a, b, etc. (e.g., represented by the first and second rows of second data structure 310 and so on). Each transaction file 312 is associated with an account (e.g., of a purchaser who has been issued a payment card) and typically stores a number of account transactions associated with that account. Generally, the same principles may apply to transaction files 312 in second data structure 310 as are described above with regard to transaction files 302 included in first data structure 300. For example, some of the same fields are used, though the values for various fields represented in second data structure 310 (e.g., second address, validation code, number of filed transactions, etc.) may be different than those shown in first data structure 300.

Thus, while there may be commonalities between first and second data structures 300 and 310, one difference lies in the manner in which first and second data structures 300 and 310 are utilized in system 200, for example, in order to provide sufficient structure to the data sets while maintaining the ability to collect large amounts of data on the fly while also being quickly searchable. For example, as described above, first and second data structures 300 and 310 may be reconstructed at different frequencies (or periodicities), and may be used differently in order to balance the need for storing and organizing large data sets against the need for quickly retrieving up-to-date information. This is also reflected in another difference—namely, second data structure 310 uses transaction file 312 to store account transactions for new accounts (i.e., accounts for which an account transaction has not yet been stored in either data cluster 202 or 204 or processed by payment network 112), while first data structure 300 uses transaction file 302 to store account transactions for existing accounts (i.e., accounts for which purchase transactions have already been stored/processed).

Another difference is that, for existing accounts (i.e., those associated with transaction files 302 in first data structure 300), second data structure 310 stores account transactions for which there is insufficient space in first data structure 300. That is, once the number of unfilled transactions for a transaction file 302 drops to zero, subsequent account transactions for that account are stored in second data structure 310 rather than first data structure 300. This phenomenon may also be referred to herein as overflow. As described above, when this is the case, payment network 112 will continue storing account transactions for existing accounts in second data structure 310 until first data structure 300 is reconstructed and additional reserved spaces are made available to transaction files 302.

Figure 3C:
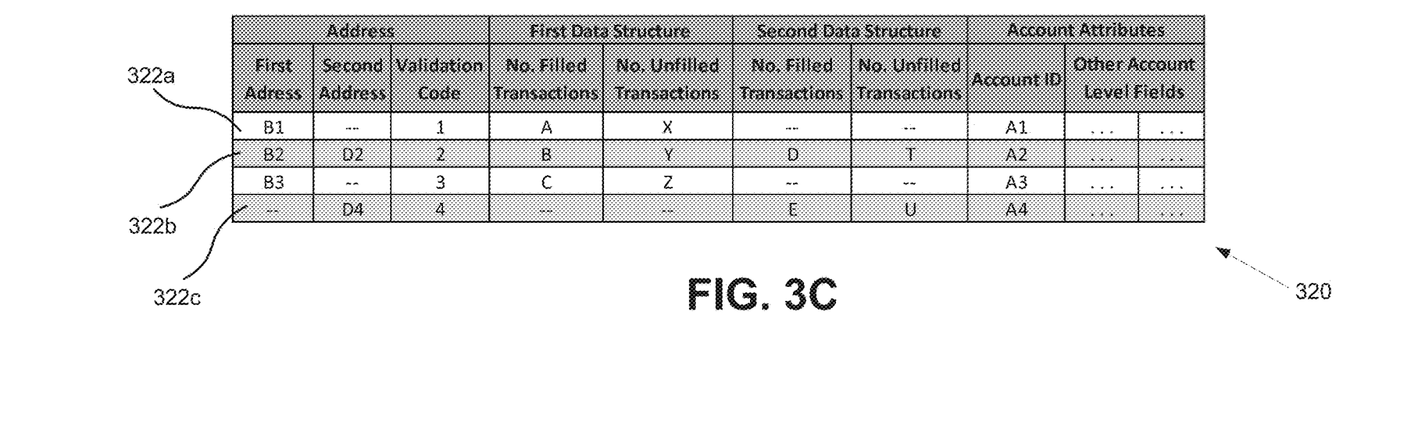
FIG. 3C illustrates an additional example data structure in connection with various embodiments of the disclosure.

FIG. 3C illustrates an example implementation of third data structure 320. As shown, in the illustrated embodiment, third data structure 320 contains information regarding first and second data structures 300 and 310. In this embodiment, third data structure 320 is represented in tabular form (though other forms are contemplated), and includes various fields and sub-fields. For example, fields may include the following: an address field, a first data structure field, a second data structure field, and an account attributes field. The address field shown includes three sub-fields: a first address sub-field, a second address sub-field, and a validation code sub-field. The first and second data structure fields also include several respective sub-fields: numbers of filled transactions sub-fields, and numbers of unfilled transactions sub-fields. In addition, the account attributes field includes a number of sub-fields—show here are the account identification ("ID") and other account-level sub-fields. One of skill in the art will appreciate that, although specific types and arrangements of fields and sub-fields are shown here in FIG. 3C in connection with third data structure 320, additional arrangements and types of fields and sub-fields are possible and are within the scope of the present disclosure. The same applies to first and second data structures 300 and 310 as well.

In addition to fields and sub-fields, FIG. 3C shows that third data structure 320 also includes a number of account files 322. Account files 322, in various embodiments include information associated with the accounts of purchasers 102. This information may include transaction file information and other information, e.g., transaction data, as will become clear and as will be appreciated by one of skill in the art, given the following three illustrative scenarios. In the first scenario (see, e.g., account file 322a), there is a pointer to first data structure 300 stored in the first address sub-field of third data structure 320, but there is no pointer to second data structure 310 stored in the second address sub-field of third data structure 320. In the second scenario (see, e.g., account file 322b) there are respective pointers to both first and second data structures 300 and 310 in the first and second address sub-fields. In the third scenario (see, e.g., account file 322c), there is no pointer to first data structure 300 stored in the first address sub-field of third data structure 320, but there is a pointer to second data structure 310 in the second address sub-field of third data structure 320. The significance of each of these illustrative scenarios is explained in turn, as follows.

Regarding the first scenario, as shown in FIG. 3C in connection with account file 322a, the first address field contains a pointer to location B1 in memory, at which location a portion of account file 322a is stored. It will be noted that B1 is the first address of transaction file 302a stored in first data structure 300, with its accompanying fields and associated information. Therefore, in this example, for account file 322a, the first address field points to transaction file 302a stored in first data structure 300. Also, as mentioned above, the second address field of account file 322a is blank. This indicates that no portion of account file 322a is currently stored in second data structure 310. As explained above, this may be the case when each account transaction is associated with an existing account for which a transaction file 302 has already been created in first data structure 300, and when there still remain unfilled transactions in transaction file 302a. Once the number of unfilled transactions X decreases to zero for transaction file 302a, however, the second address field could be used for subsequent account transactions stored in second data structure 310 (e.g., pursuant to overflow). Similarly, account file 322a includes a number of filled transactions contained in first data structure 300. Again, in this first scenario, the number of filled an unfilled transactions for second data structure 310 is zero, because there has been no transaction file 312 created in second data structure 310 for this account (and hence there is also no pointer to second data structure 310).

Turning now to the second above-mentioned illustrative scenario, as shown in FIG. 3C, account file 322b includes pointers to transaction files in both first and second data structures 300 and 310 (i.e., transaction files 302b and 312a). These pointers are contained respectively in the first and second address sub-fields of account file 322b. This indicates that account transactions have occurred for an account already associated with a transaction file—here, transaction file 302b—stored in first data structure 300, and also that all of the available reserved spaces in transaction file 302b have been filled (i.e., Y=0). As such, a number of account transactions for this particular account have been stored in second data structure 310, namely, in transaction file 312a, in this example (which illustrates overflow).

In the third scenario mentioned above, in the first address sub-field, account file 322c contains no pointer to first data structure 300. This indicates that the account transactions associated with account file 322c pertain to a new account and have thus been stored in second data structure 310. Accordingly, the second address sub-field of third data structure 320 contains a pointer to transaction file 312b in second data structure 310.

Referring again to FIG. 3C and particularly to account file 322a, a validation code is also stored in third data structure 320. It will be noted that the validation code for account file 322a is the same validation code associated with transaction file 302a in first data structure 300, to which account file 322a points. Likewise, with regard to account file 322b, the validation code is common between first, second, and third data structures 300, 310, and 320. In this manner, the validation code may be used to confirm that any given information or transaction data from these data structures is associated with a particular account. Moreover, in the embodiment illustrated in FIG. 3C, account file 322a includes an account ID sub-field and other account-level sub-fields. The account ID may be an account number, for example. The account-level sub-fields may contain various types of information related to the account, such as date of account inception, total number of transactions for the account, average number of account transactions over a time period, average daily balance on the account, and so on.

In some embodiments of the disclosure, application engine 206 stores or otherwise has access to third data structure 320. In this manner, in order to generate actionable input for a particular account using the transaction data stored in one or more of first and second clusters 202 and 204, application engine 206 may utilize the first and second address pointers in third data structure 320 to retrieve transaction data stored in one or more of first and second data structures 300 and 310 for the particular account of interest. In this manner, application engine 206 may draw transaction data from one or more of first and second data structures 300 and 310. As such, application engine 206 may validate the transaction data using the validation code associated therewith to confirm the transaction data is associated with the particular account of interest.

Once validated, the transaction data from first and/or second data structures 300 and 310 may be retrieved and combined where applicable (i.e., if retrieved from both data structures), for example, for a single account or group of accounts. The combined data may then be used to calculate a score or set of scores for the account, e.g., by applying the data to a scoring model. Additionally, for example, a grouping of accounts having commonalities (e.g., purchaser-based commonalities) or other characteristics may be created, and application engine 206 may draw transaction data from these groupings and apply the transaction data to a scoring model to generate a score or set of scores for one of the accounts. Providing a score based upon a grouping of accounts rather than just a single account may be useful to augment the data set used to generate the score. This may provide a more robust data set for the score.

In any case, in various embodiments, the score may be indicative of activities or other purchase-related events that may be appealing to the purchaser (or account holder)—e.g., special deals or other opportunities. These activities may, for example, occur at retailers or other merchants (whether brick-and-mortar or online) that the purchaser frequents, or at retailers/merchants that, based on the transaction data, are likely to be frequented by the purchaser. As alluded to above, the score is typically generated by applying transaction data to a model (or scoring model). In some instances, the model may also be referred to as a propensity model, indicating that the score generated by the model, given transaction data as the input, generally reflects the likelihood that an event or activity will be appealing to the purchaser.

The propensity model may be based on the purchaser's geographic location. Thus, for example, in the instance wherein application engine 206 validates and retrieves transaction data from one or more of first and second data clusters 202 and 204 to generate the score, it may be advantageous for this to be done relatively quickly. By way of illustration, the purchaser may be on the freeway as a passenger in a car, and may be seeking a recommendation for a restaurant (e.g., using purchaser terminal 208). Application engine 206 may draw (e.g., validate and retrieve) transaction data from first and/or second data clusters, and apply the transaction data to the propensity model to generate a score or set of scores corresponding to one or more recommendations of restaurants for the purchaser.

Application engine 206 may then transmit the score to the purchaser. For example, one or more of the scores or recommendations generated using the scores may be transmitted back to purchaser terminal 208. Purchaser terminal 208 may be, for example, an electronic device such as a computer, mobile phone, or the like, belonging to or associated with the holder of the account (or purchaser) for which the score was calculated. Continuing the illustrative example, the purchaser may then instruct the driver of the car to exit the freeway based on the recommendation and go to the recommended restaurant. As shown in this example, timing may be of the essence in the scoring process. Embodiments of the present disclosure, which, as described above, facilitate storing, sorting, and analyzing account transactions in a real-time, up-to-date fashion, are thus advantageous for such on-the-fly scoring applications. In other examples, timing is less critical. In some such examples, the score may be based upon a snapshot of the transaction data that is time-variable. For example, the score may be based upon transaction data as of one year ago rather than the present state of the transaction data.

Referring again to FIGS. 2 and 3A-C, additional interactions between the various elements of system 200 will now be explained further. As described above, second data cluster 204 may be merged into first data cluster 202 during the reconstruction of first data cluster 202, which reconstruction may, in some embodiments, occur according to a first periodicity. Second data cluster 204 may also be merged into first data cluster 202 at other times as well. In any case, second data cluster 204 and associated second data structure 310 may be reconstructed, apart from being merged into first data cluster 202, according to a second periodicity.

As alluded to, reconstruction of first data cluster 202 may also involve reconstruction of first data structure 300. In some embodiments, this involves the filled portions of transaction files 312 of second data structure 310 being appended to corresponding filled portions of transaction files 302 in first data structure 300 (i.e., when both transaction files 302 and 312 pertain to the same underlying account). In other embodiments, and as explained above, there may be no corresponding transaction file 302 in first data structure 300 (see, e.g., transaction file 312b). In such instances, a new transaction file 302 is created in first data structure 300 and the transaction file 312 from second data structure 310 is merged into or stored in the new transaction file 302. One of skill in the art will recognize that merging second data cluster 204 into first data cluster 202 may also entail adding space (e.g., in memory) to first data cluster 202 for the transaction files 312 incoming from second data cluster 204.

Furthermore, when first and second data structures 300 and 310 are reconstructed (not necessarily at the same time), a number of new reserved spaces may be allocated to the various transaction files 302 and 312 stored therein, in order to accommodate storage of future account transactions in transaction files 302 and 312 until the next reconstruction. In one embodiment, payment network 112 determines numbers of reserved spaces to include for each transaction file 302 and 312 in first and second data structures 300 and 310. In any case, this determination may be based upon respective first and second periodicities, with which first and/or second data structures 300 and/or 310 are reconstructed. For example, as described above, given its typical relative size, first data structure 300 is reconstructed at a lower periodicity (e.g., once per week). If, however, payment network 112 determines that transaction files 302 in first data structure 300 have been allocated too few reserved spaces in the past, payment network 112 may determine that a greater number of reserved spaces should be allocated. For example, too few reserved spaces being allocated to first data structure 300 may result in more frequent reconstruction of second data structure 310 or second data cluster 204, or may result in the more frequent addition of transaction files 312 to second data structure 310. In this situation, it may be more efficient to simply allocate a greater number of reserved spaced to first data structure 300 in the first instance (i.e., during reconstruction).

Referring again to FIG. 2, in various embodiments, different configurations of system 200 are contemplated. For example, one or more of first and second data clusters 202 and 204 and application engine 206 may be integrated into payment network 112, and may in operation utilize one or more of storage 114, server 116, and mainframe 118. Alternatively or additionally, one or more of first and second data clusters 202 and 204 and application engine 206 may include respective local memory for storing account transactions and files, pointers, and the like, as may be applicable, and/or may include respective local servers or processing capabilities similar to, if on a different scale than, server 116 and/or mainframe 118. In addition, in one implementation of the disclosure, one or more of first and second data clusters 202 and 204 are Hadoop clusters.

Figure 4:
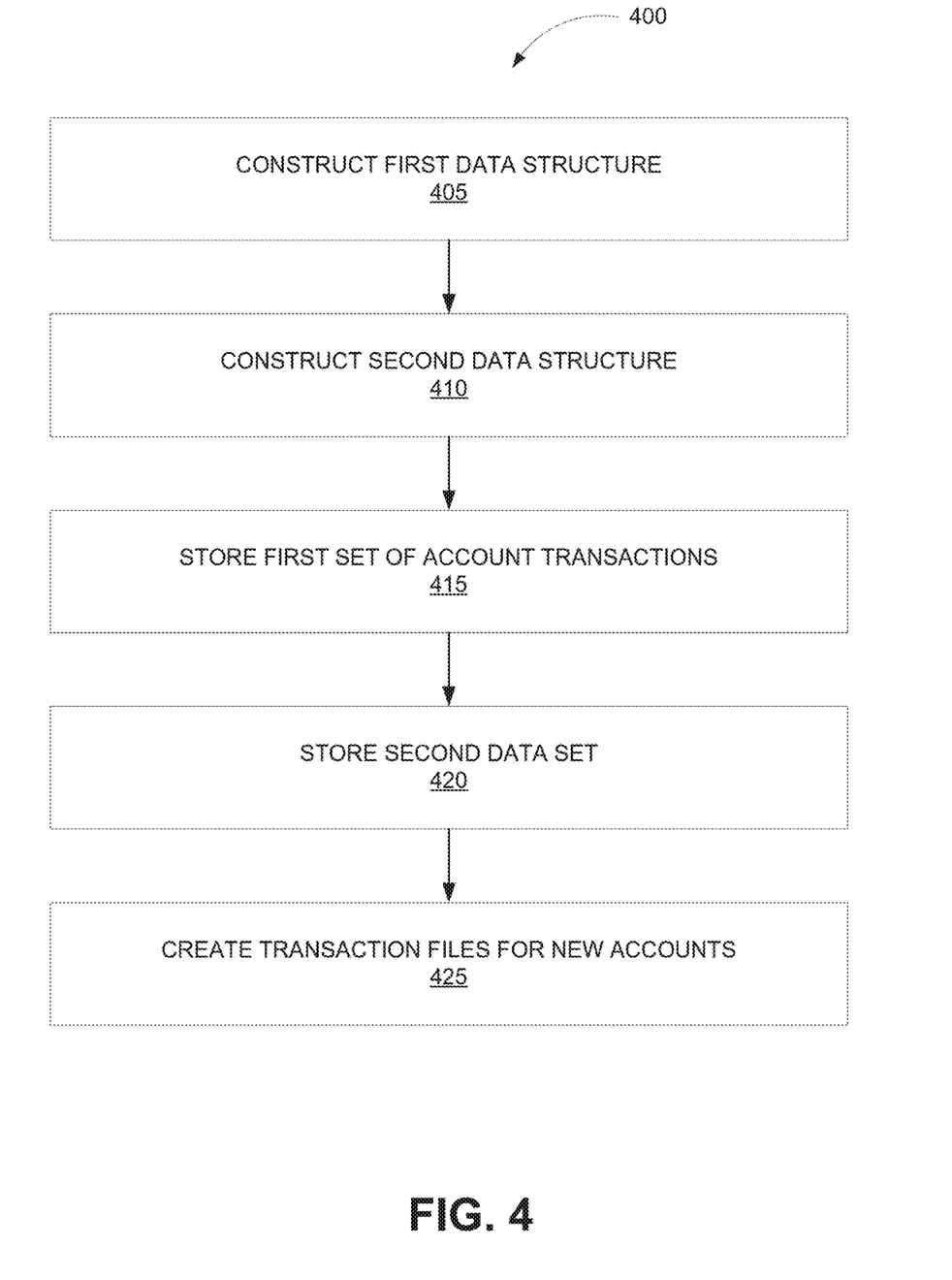
FIG. 4 is an example flow diagram illustrating various operations that may be performed to sore, sort, and analyze account transactions in accordance with various embodiments of the disclosure.

FIG. 4 illustrates a flow chart depicting various operations of method 400 and accompanying embodiments for storing, sorting, and analyzing account transactions for a set of accounts in a payment network (e.g., 112), in accordance with the present disclosure. The operations of method 400 may be carried out, in some embodiments, by one or more of the components/elements of systems 100 and 200 described above and referenced in FIGS. 1, 2, and 3A-3C. In such instances, the description of method 400 may refer to the corresponding component/element. Nevertheless, it will be appreciated that this does not necessarily limit method 400 to the particular component/element referred to. It will be appreciated by one of skill in the art, however, that aspects and features described above in connection with systems 100 and 200 and elements therein, including variations thereof, may be applied to the various operations described in connection with method 400.

Generally, method 400 facilitates storing, sorting, and analyzing account transactions for a set of accounts. The account transactions may be processed in a payment network (e.g., 112) by utilizing various data structures configured for efficient updating and searching of large data sets. For example, in one implementation, first and second data clusters 202 and 204 may be used to store and sort account transactions, and may be sized and/or configured differently, e.g., to include different numbers of reserved spaces. As such, time-consuming reconstruction of the data structures in respective first and second data clusters 202 and 204 may be avoided so that the available data sets may be up-to-date and accessible in real-time, for example, for on-the-fly analytics purposes. In this manner, although the data sets associated with account transactions may be large, these data sets may be used to create actionable, up-to-date input for purchasers or account holders.

Referring again to FIG. 4, at operation 405, method 400 entails constructing a first data structure (e.g., 300) in a first data cluster (e.g., 202). The first data structure includes a set of reserved spaces for each account of the set of accounts active on the payment network (e.g., 112). At operation 410, method 400 involves constructing a second data structure (e.g., 310) in a second data cluster (e.g., 204). The second data structure includes a set of second reserved spaces for each of the accounts. With regard to the second data structure, the accounts associated therewith may or may not be active on the payment network (e.g., 112) in terms of having entered into account transactions. At operation 415, method 400 involves storing a first set of the account transactions in the set of first reserved spaces. Typically, these are the account transactions associated with accounts that are already active on the payment network 112—i.e., accounts that have already been used to enter into account transactions.

At operation 420, method 400 involves storing a second set of the account transactions in the second reserved spaces, only upon the set of first reserved spaces being used. In other words, according to operations 415 and 420, account transactions are stored in the first set of reserved spaces (e.g., in first data structure 300) until there are insufficient reserved spaces remaining to store subsequent account transactions (e.g., until the number of unfilled transactions, e.g., X drops to zero). This is also referred to herein as overflow. At operation 425, method 400 involves creating, in the second data structure (e.g., 310), transaction files for new accounts. As described above, account transactions for accounts that have not previously entered into account transactions are stored in second data structure 310. In this manner, time-consuming reconstruction of first data structure 300 may be avoided each time a new account enters into an account transaction on payment network 112. Additional details and variations with respect to method 400 are contemplated and are set forth above with regard to systems 100 and 200. The repetition of these details and variations is forgone here for convenience, given that one of skill in the art will appreciate the same upon studying the present disclosure.

Figure 5:
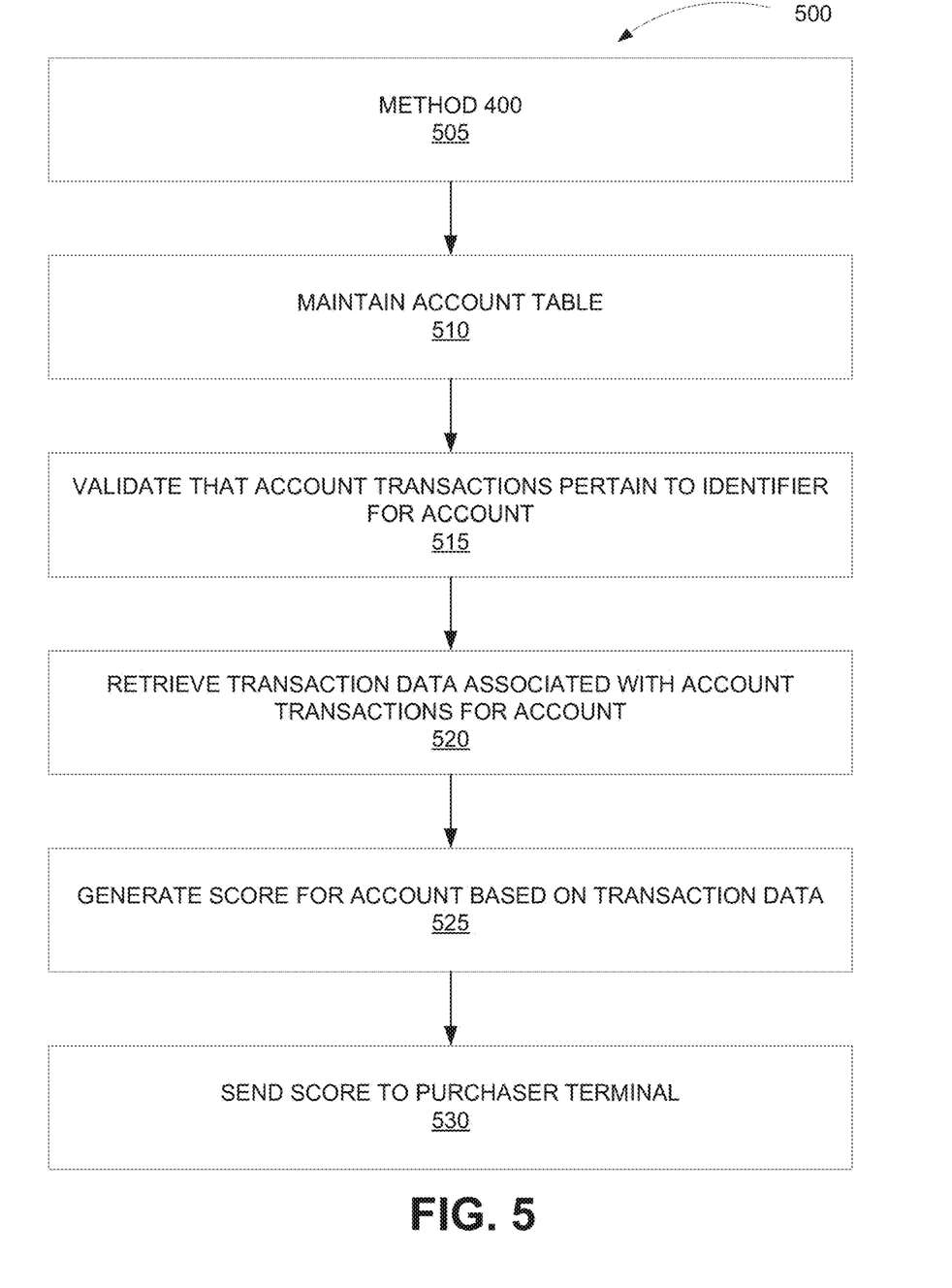
FIG. 5 is an example flow diagram illustrating various operations that may be performed to store, sort, and analyze account transactions in accordance with additional embodiments of the disclosure.

FIG. 5 illustrates a flow chart describing various operations of method 500 that may be performed in order facilitate storing, sorting, and analyzing account transactions for a set of accounts, in accordance with further embodiments of the disclosure. Method 500 may be carried out by one or more components/elements of systems 100 and 200, and may, for instance, include one or more operations of method 400 (e.g., at operation 505). As with method 400, references to components/elements described in FIGS. 1, 2, and 3A-3C are for purposes of illustration only and do not necessarily limit method 500 to the particular component/element referenced. Likewise, it will be appreciated by one of skill in the art that aspects and features described above in connection with systems 100 and 200 and elements therein, including variations thereof, may be applied to the various operations described in connection with method 500.

As shown in FIG. 5, one embodiment of method 500 includes operation 510, which involves maintaining an account table for the set of accounts described with regard to FIG. 4. The account table includes an identifier for each account in the set of accounts. By way of example, FIG. 3C illustrates third data structure 320, which, in embodiments of the disclosure may be such an account table. In this regard and in some embodiments, the account ID sub-field contains identifiers for each of the accounts in the set of accounts. The account table (e.g., 320) also includes at least one pointer to first and/or second data structures (e.g., 300, 310), and particularly, by way of example, to one or more of transactions files 302 and 312 therein. For example, third data structure 320 shown in FIG. 3C includes pointers in the first and second address sub-fields.

Furthermore, the account table in this embodiment includes a validation code sub-field with validation codes for each account in the set of accounts (e.g., validation code field or sub-field in FIG. 3A-C). In this connection, in one example implementation, method 500 also includes operation 515, which involves validating that the first and second sets of account transactions pertaining to the identifier for at least one of the accounts. Operation 515 may be done using the validation code for the at least one account. Further to this example implementation, method 500 includes operation 520, which involves retrieving transaction data associated with the account transactions for the validated account or accounts. Pursuant to operation 520, the transaction data is retrieved from one or more of the first and second data clusters (e.g., 202 and/or 204) using one or more of the above-described pointers.

Method 500 also includes, in one embodiment, operation 525, which entails generating a score for the at least one account based upon the transaction data. The score, in this embodiment, is generated using a propensity model, the details of which are described above with reference to application engine 206. Upon generating the score (e.g., using application engine 206), method 500 may include sending the score to a purchaser terminal (e.g., 208) associated with the at least one account, at operation 530. As described above, in light of the advantages of the present disclosure, the propensity model may be used to generate a score that reflects a robust data set of timely data for a purchaser. In this manner, the propensity score is more likely to reflect trends and current preferences of the purchaser, and thus is more likely to be useful. Additional details and variations with respect to method 500 are contemplated and are set forth above with regard to systems 100 and 200. The repetition of these details and variations is forgone here for convenience, given that one of skill in the art will appreciate the same upon studying the present disclosure.

Figure 6:
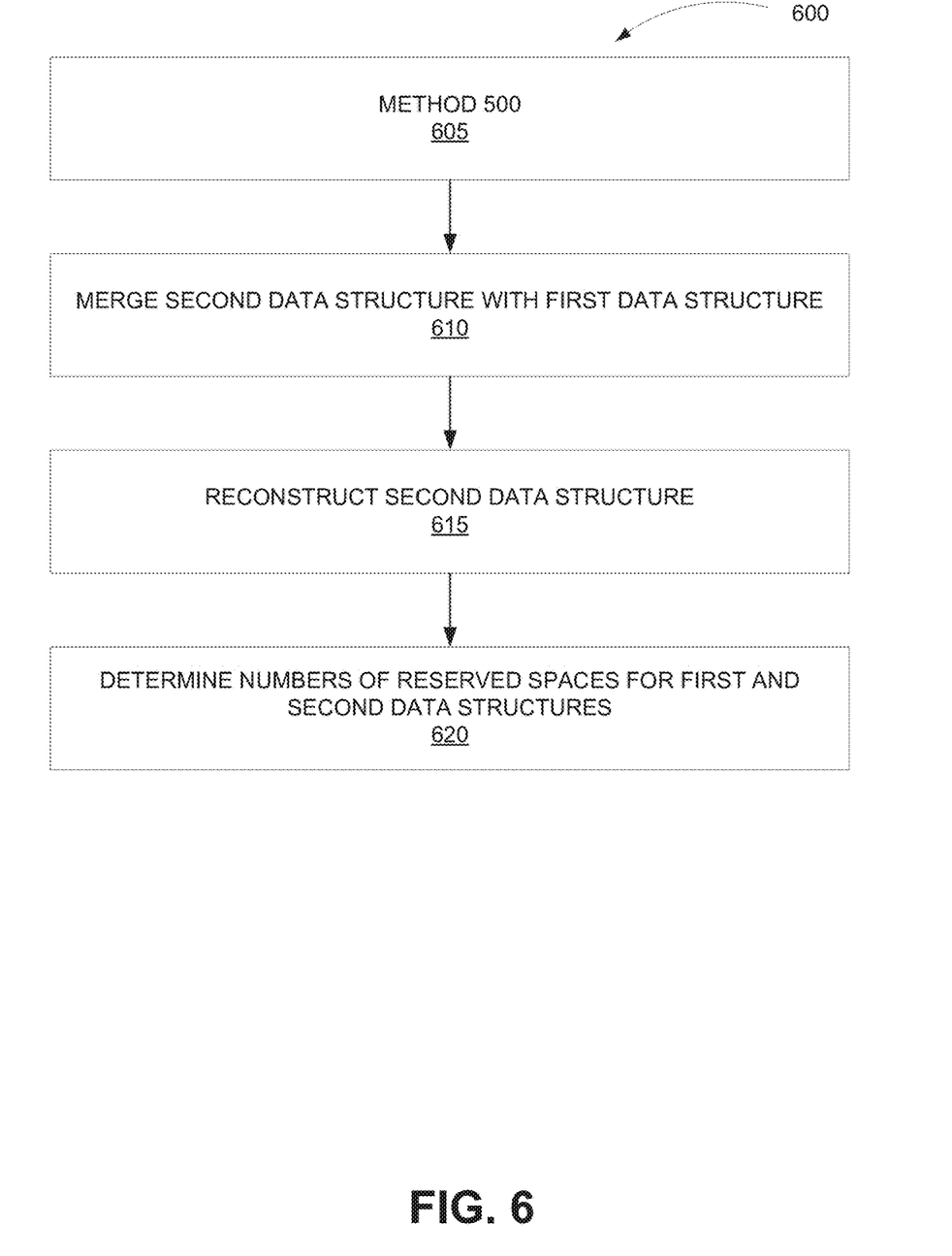
FIG. 6 is another example flow diagram illustrating various operations that may be performed to store, sort, and analyze account transactions in accordance with further embodiments of the disclosure.

FIG. 6 illustrates a flow chart describing various operations of method 600 that may be performed in order to facilitate storing, sorting, and analyzing account transactions for a set of accounts, in accordance with additional embodiments of the disclosure. Method 600 may be carried out by one or more components/elements of systems 100 and 200, and may, for instance, include one or more operations of method 500 (e.g., at operation 605). As with methods 400 and 500, references to components/elements described in FIGS. 1, 2, and 3A-3C are for purposes of illustration only and do not necessarily limit method 600 to the particular component/element referenced. Likewise, it will be appreciated by one of skill in the art that aspects and features described above in connection with systems 100 and 200 and elements therein, including variations thereof, may be applied to the various operations described in connection with method 600.

Referring now to FIG. 6, one embodiment of method 600 includes operation 610, which involves merging the second data structure (e.g., 310) with the first data structure (e.g., 300). At operation 615, method 600 involves reconstructing the second data structure. This may occur after the merging of the second data structure (e.g., 310) with the first data structure (e.g., 300). In any case, during reconstruction, and as shown at operation 620, one instance of method 600 involves determining numbers of reserved spaces to include in the first and second data structures. In this instance, the determination is based on the number of account transactions for each account and the allocation of these account transactions among the first and second data structures prior to merging. For example, and as alluded to above, a high number of account transactions being stored in the second data structure (e.g., 310) may result in the second data structure being reconstructed relatively more frequently (or with a higher periodicity). Depending on the particular application, the second data structure (e.g., 310) may be reconstructed about once per day, for example.

The reconstruction frequency (or periodicity) of the second data structure in this instance may be tempered by allocating more reserve spaces to the first data structure (e.g., 300), such that there is less overflow of account transactions into the second data structure (e.g., 310), which overflow is described above. Further, it will be appreciated that this allocation determination may be made at the account level rather than the data structure level (i.e., reserve spaces may be allocated on an account-by-account basis). Likewise, another approach to reducing or tempering the reconstruction frequency of the second data structure would be to simply allocate more reserve spaces thereto. Practically speaking, however, it may be beneficial to keep the size of the second data structure (e.g., 310) relatively small. Thus, in another instance, determining the numbers of reserved spaces to include in the first and second data structures is further based upon a frequency (or periodicity) with which the second data structure is reconstructed. Additional details and variations with respect to method 600 are contemplated and are set forth above with regard to systems 100 and 200. The repetition of these details and variations is forgone here for convenience, given that one of skill in the art will appreciate the same upon studying the present disclosure.

Figure 7:
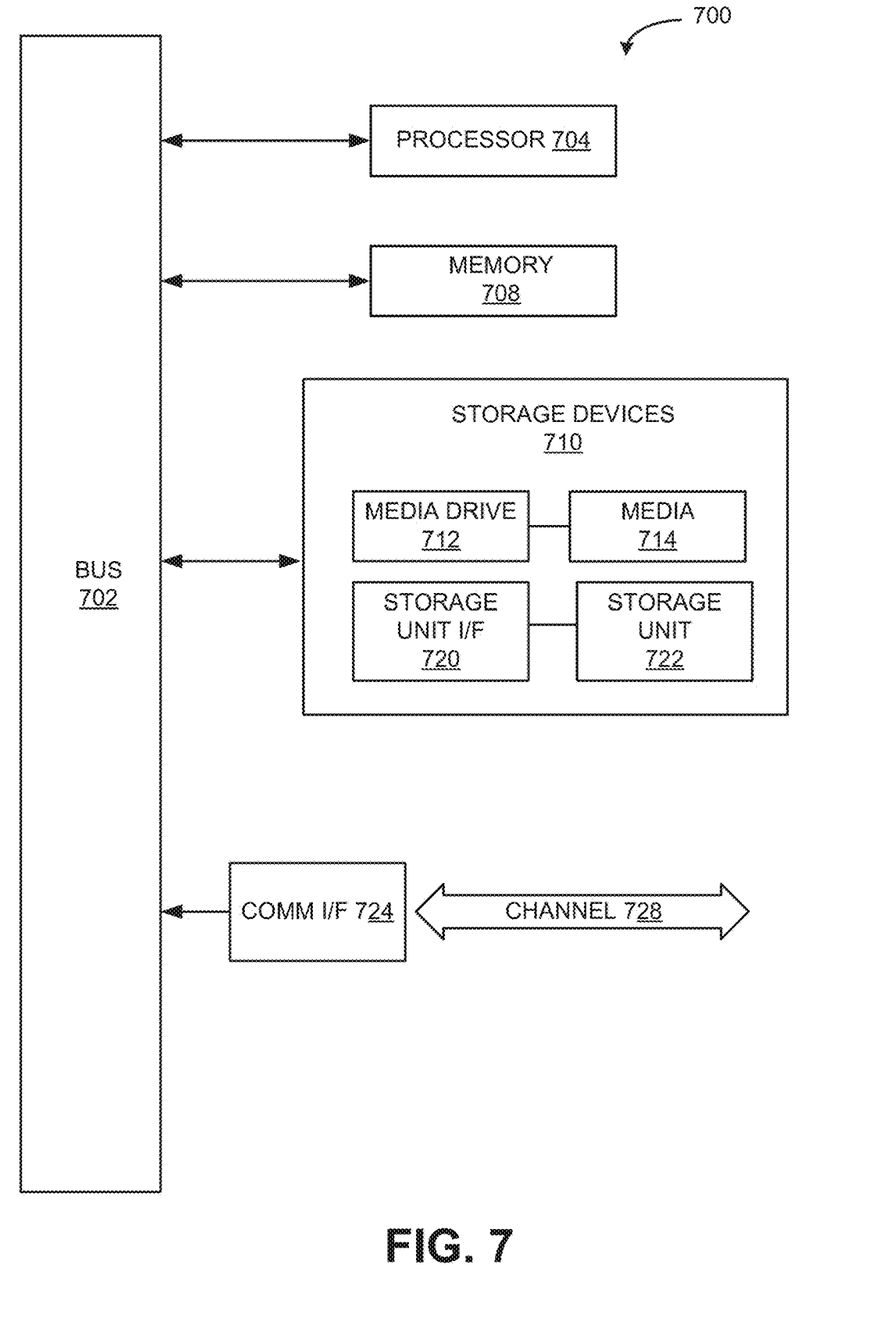
FIG. 7 illustrates an example computing module that may be used to implement features of various embodiments of the disclosure.

FIG. 7 illustrates example computing module 700, an example of which may include a processor/controller resident on or used in conjunction with a payment network (e.g., 112), for example, in the form of mainframe 118, or a processor/controller used to execute computational functions in application engine 206. Computing module 700 may be used to implement various features and/or functionality of embodiments of the systems and methods disclosed herein. In one embodiment of the disclosure, computing module 700 includes a non-transitory computer-readable medium having computer-executable code embodied thereon. The computer-executable code is configured to cause a computer system (e.g., mainframe 118) in a payment network (e.g., payment network 112) to receive and process account transactions associated with one or more accounts. The computer-executable code is also configured to cause the computer system to construct first and second data structures. The first data structure includes a set of first reserved spaces for each of the accounts, and the second data structure includes a set of second reserved spaces for each of the accounts. The computer-executable code is further configured to cause the computer system to store a first set of the account transactions in the first set of reserved spaces for each of the accounts and a second set of the account transactions in the second set of reserved spaces for each of the accounts.

Moreover, the computer-executable code is configured to cause the computer system to determine respective sizes of first and second sets of reserved spaces for each of the accounts. The determination may be based on historical data related to the account transactions associated with the accounts. For example, if particular accounts are historically involved in a number of account transactions that is higher, or lower, than predetermined thresholds, it may be determined that those particular accounts should receiver more, or less, reserved spaces, as the case may be (e.g., during reconstruction of transaction files associated with those accounts). One of skill in the art will appreciate in light of the above description that accounts associated with higher volumes of account transactions may be allocated a greater number of reserve spaces than accounts associated with lower volumes. Patterns in the volume of account transactions may also be taken into account in determining the number of reserved spaces to allocate to an account. For example, for some accounts, the number of account transactions may rise or fall seasonally, over the weekend, as a function of geographic location, and so on. Thus, in one implementation, the historical data includes the number of account transactions that occurred over a time period (e.g., a week, a month, etc.). The computer-executable code, in another embodiment, is configured to cause the computer system to determine the size of the first set of reserved spaces for each of the accounts further based on the frequency or periodicity with which the first data structure is reconstructed.

In another instance of the disclosure, the computer-executable code is configured to cause the computer system to store the second set of the account transactions in the second set of reserved spaces only upon either of two conditions being satisfied: if the payment network (e.g., payment network 112) is unable to store the second set of account transactions in the set of first reserved spaced, or if no account associated with an account transaction of the second set of account transactions is also associated with an account transaction of the first set of account transactions. The first condition represents the scenario in which the first set or reserved spaces is essentially filled, while the second condition represents the scenario of the account transaction in the second set of account transactions being associated with a "new" account on the payment network. As alluded to above with regard to various embodiments, this may occur when the number of unfilled transactions (e.g., in first data structure 300) drops below a particular level or drops to zero. In this instance, overflow transactions may be stored in the second data structure (e.g., 310), for example. In an additional example implementation of the disclosed non-transitory computer-readable medium, the computer-executable code is further configured to cause the computer system to create and update a third data structure (e.g., 320). The third data structure may include pointers to transaction files associated with the accounts in the first and second data structures (e.g., 300 and 310).

With regard to the above-described embodiments of computing module 700, one of skill in the art will appreciate additional variations and details regarding the functionality of the embodiments, as set forth herein in the context of systems and method described with reference to FIGS. 1, 2, 3A-C, and 4-6. For example, it will be appreciated that the computer-executable code described herein may be augmented in various embodiments to include some of the functionalities and features described above with respect to systems 100 and 200, and method 400, 500, and 600. In this connection, it will also be appreciated by one of skill in the art that features and aspects of the various embodiments (e.g., systems) described herein may be implemented with respected to other embodiments (e.g., methods) described herein without departing from the spirit of the disclosure.

As used herein, the term module might describe a given unit of functionality that may be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described may be shared in part or in total among one or more modules. In other words, as would be apparent to one of ordinary skill in the art after reading this description, the various features and functionality described herein may be implemented in any given application and may be implemented in one or more separate or shared modules in various combinations and permutations. Even though various features or elements of functionality may be individually described or claimed as separate modules, one of ordinary skill in the art will understand that these features and functionality may be shared among one or more common software and hardware elements, and such description shall not require or imply that separate hardware or software components are used to implement such features or functionality.

Where components or modules of the application are implemented in whole or in part using software, in one embodiment, these software elements may be implemented to operate with a computing or processing module capable of carrying out the functionality described with respect thereto. One such example computing module is shown in FIG. 7. Various embodiments are described in terms of example computing module 700. After reading this description, it will become apparent to a person skilled in the relevant art how to implement the application using other computing modules or architectures.

Referring now to FIG. 7, computing module 700 may represent, for example, computing or processing capabilities found within mainframes, supercomputers, workstations or servers; desktop, laptop, notebook, or tablet computers; hand-held computing devices (tablets, PDA's, smartphones, cell phones, palmtops, etc.); or the like, depending on the application and/or environment for which computing module 700 is specifically purposed.

Computing module 700 may include, for example, one or more processors, controllers, control modules, or other processing devices, such as a processor 704. Processor 704 might be implemented using a special-purpose processing engine such as, for example, a microprocessor, controller, or other control logic. In the illustrated example, processor 704 is connected to bus 702, although any communication medium may be used to facilitate interaction with other components of computing module 700 or to communicate externally.

Computing module 700 may also include one or more memory modules, simply referred to herein as main memory 708. For example, random access memory (RAM) or other dynamic memory may be used for storing information and instructions to be executed by processor 704. Main memory 708 may also be used for storing temporary variables or other intermediate information during execution of instructions to be executed by processor 704. Computing module 700 may likewise include a read only memory ("ROM") or other static storage device coupled to bus 702 for storing static information and instructions for processor 704.

Computing module 700 may also include one or more various forms of information storage devices 710, which may include, for example, media drive 712 and storage unit interface 720. Media drive 712 may include a drive or other mechanism to support fixed or removable storage media 714. For example, a hard disk drive, a floppy disk drive, a magnetic tape drive, an optical disk drive, a CD or DVD drive (R or RW), or other removable or fixed media drive may be provided. Accordingly, removable storage media 714 may include, for example, a hard disk, a floppy disk, magnetic tape, cartridge, optical disk, a CD or DVD, or other fixed or removable medium that is read by, written to or accessed by media drive 712. As these examples illustrate, removable storage media 714 may include a computer usable storage medium having stored therein computer software or data.

In alternative embodiments, information storage devices 710 may include other similar instrumentalities for allowing computer programs or other instructions or data to be loaded into computing module 700. Such instrumentalities may include, for example, fixed or removable storage unit 722 and storage unit interface 720. Examples of such removable storage units 722 and storage unit interfaces 720 may include a program cartridge and cartridge interface, a removable memory (for example, a flash memory or other removable memory module) and memory slot, a PCMCIA slot and card, and other fixed or removable storage units 722 and storage unit interfaces 720 that allow software and data to be transferred from removable storage unit 722 to computing module 700.

Computing module 700 may also include a communications interface 724. Communications interface 724 might be used to allow software and data to be transferred between computing module 700 and external devices. Examples of communications interface 724 include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 may typically be carried on signals, which may be electronic, electromagnetic (which includes optical) or other signals capable of being exchanged by a given communications interface 724. These signals may be provided to communications interface 724 via channel 728. Channel 728 may carry signals and may be implemented using a wired or wireless communication medium. Some non-limiting examples of channel 728 include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, main memory 708, storage unit interface 720, removable storage media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions may enable the computing module 700 to perform features or functions of the present application as discussed herein.

Various embodiments have been described with reference to specific example features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various example embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the present application, whether or not such embodiments are described and whether or not such features are presented as being a part of a described embodiment. Thus, the breadth and scope of the present application should not be limited by any of the above-described example embodiments.

Terms and phrases used in the present application, and variations thereof, unless otherwise expressly stated, should be construed as open ended as opposed to limiting. As examples of the foregoing: the term "including" should be read as meaning "including, without limitation" or the like;

the term "example" is used to provide illustrative instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed in multiple groupings or packages or across multiple locations.

Additionally, the various embodiments set forth herein are described in terms of example block diagrams, flow charts, and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

What is claimed is:

1. A method for storing, processing, retrieving, and reconstructing large data sets, the method comprising:

constructing a first data structure in a first data cluster on a storage device within a payment transaction network of a real-time data storage and analytics system, the first data structure comprising a set of first reserved spaces for each account in a first set of accounts;

constructing a second data structure in a second data cluster on the storage device within the payment transaction network of the real-time data storage and analytics system, the second data structure comprising a set of second reserved spaces for each account in a second set of accounts;

storing a first set of account transactions in the set of first reserved spaces;

storing a second set of account transactions in the second set of reserved spaces, only upon the set of first reserved spaces being used;

creating, in the second data structure, transaction files for new accounts;

merging the second data structure into the first data structure; and reconstructing the second data structure;

wherein the first set of accounts comprises active accounts within the payment transaction network and wherein the second set of accounts comprises inactive accounts within the payment transaction network.

2. The method of claim 1, further comprising:

maintaining an account table for the set of accounts, the account table comprising:

an identifier for each account in the set of accounts;

at least one pointer that references one of the first data structure and the second data structure; and a validation code for each account in the set of accounts.

3. The method of claim 2, further comprising:

validating, for at least one account in the set of accounts, that the first and second sets of account transactions pertain to the identifier for the at least one account, using the validation code for the at least one account;

retrieving transaction data associated with the account transactions for the at least one account, wherein the transaction data is retrieved from one or more of the first and second data clusters using the at least one pointer.

4. The method of claim 3, further comprising generating a score for the at least one account based upon the transaction data, wherein the score is generated using a propensity model.

5. The method of claim 4, further comprising, sending the score to a purchaser terminal associated with the at least one account.

6. The method of claim 1, further comprising determining numbers of reserved spaces to include in the first and second data structures based on the number of the account transactions associated with each account and based on the allocation of the account transactions among the first and second data structures prior to merging.

7. The method of claim 6, wherein determining the numbers of reserved spaces to include in the first and second data structures is further based upon a frequency with which the second data structure is reconstructed.

* * * * *